United States Patent
Ayers et al.

(10) Patent No.: US 7,399,798 B2
(45) Date of Patent: Jul. 15, 2008

(54) PROCESS FOR FORMING LIGNOCELLULOSIC PRODUCTS AND PRODUCTS FORMED THEREBY

(75) Inventors: Tim C. Ayers, Eugene, OR (US); Philip N. Cote, Eugene, OR (US); Wally K. Rowland, Eugene, OR (US); Robert Joe Rubash, Eugene, OR (US)

(73) Assignee: Willamette Valley Company, Eugene, OR (US)

(*) Notice: Subject to any disclaimer, the term of this patent is extended or adjusted under 35 U.S.C. 154(b) by 812 days.

(21) Appl. No.: 11/004,653

(22) Filed: Dec. 3, 2004

(65) Prior Publication Data
US 2005/0153043 A1 Jul. 14, 2005

Related U.S. Application Data

(60) Provisional application No. 60/526,863, filed on Dec. 3, 2003.

(51) Int. Cl.
*C08F 251/02* (2006.01)
*B27N 3/00* (2006.01)

(52) U.S. Cl. .............. 524/9; 264/109; 524/13; 524/733; 524/734

(58) Field of Classification Search .............. None
See application file for complete search history.

(56) References Cited

U.S. PATENT DOCUMENTS

| 4,357,194 | A* | 11/1982 | Stofko ............... 156/308.6 |
| 2004/0259218 | A1* | 12/2004 | Weimer et al. ........ 435/170 |
| 2005/0256262 | A1* | 11/2005 | Hill et al. ............. 524/702 |
| 2007/0011973 | A1* | 1/2007 | Sinclair et al. ........ 52/503 |

* cited by examiner

*Primary Examiner*—Mary Lynn F Theisen
(74) *Attorney, Agent, or Firm*—Marger Johnson & McCollom PC

(57) ABSTRACT

A process is provided for producing lignocellulosic board panels. The process comprises providing lignocellulosic material and an adhesive system. The adhesive system comprises (a) a base adhesive resin and (b) an extender and/or filler material comprising sugar beet material. The adhesive system (i) retains substantial moisture in the lignocellulosic material, and/or (ii) creates a relatively higher initial viscosity, and/or (iii) maintains a substantially stable viscosity thereof over time. The lignocellulosic material is combined with adhesive system. The combined lignocellulosic material and adhesive is then formed into the lignocellulosic board panels.

23 Claims, 1 Drawing Sheet

PROCESS FOR FORMING LIGNOCELLULOSIC PRODUCTS AND PRODUCTS FORMED THEREBY

RELATED APPLICATION

This application claims the benefit of U.S. Provisional Application No. 60/526,863 filed on Dec. 3, 2003.

BACKGROUND OF THE INVENTION

This invention relates to adhesive systems used in the manufacture of certain lignocellulosic products, and to the lignocellulosic products which are formed using these adhesive systems. More specifically, this invention is directed to adhesive systems comprising aldehyde resins used in the manufacture of certain lignocelluosic products, and to the lignocellulosic products which are formed using these aldehyde resin adhesive systems.

Aldehyde resin adhesive systems are well known in the manufacture of various lignocellulosic products. In order to improve the cost of manufacturing these lignocellulosic products, certain materials known as extenders and fillers can be added to these adhesive systems. Extenders are typically substances which are added to an adhesive to reduce the amount of the primary binder required per unit area, and in turn increasing the profitability of selling the resultant lignocellulosic product. Extenders are generally designed so that they do not have an adverse effect on the binding action of the adhesive system, and preferably have a positive effect on the binding properties of the adhesive system. Examples of extenders used in aldehyde resin adhesive systems are organic flours, typically ground vegetable flour or grain flour, such as for example, corn flour or wheat flour.

A filler is a relatively non-adhesive substance added to an adhesive to improve it's working properties. For example, fillers are used to fill and bridge holes and irregularities in the outer surfaces of lignocellulosic materials. Common fillers include ground alder bark, ground nut shell flour, and furfural residue from corn cob (FRC).

A problem which can exist with respect to the use of extenders and/or fillers is that they can have an undesirable effect on the chemical and/or the physical properties of the aldehyde resin adhesive systems to which they are added. This can impede the performance of the modified aldehyde resin adhesive systems during subsequent use in product manufacture.

SUMMARY OF THE INVENTION

The board products of the present invention can be manufactured by a method which comprises consolidating or joining together lignocellulosic materials by the application of pressure and heat using an adhesive binder material. The method of the present invention is suitable in the processing of lignocellulosic materials in general to form lignocellulosic products, and is particularly useful for forming lignocellulosic board products.

The lignocellulosic product of this invention is typically a lignocellulosic board or panel formed of lignocellulosic material bound together by an adhesive system preferably including an aldehyde resin. Preferably, the lignocellosic product is plywood. The term "plywood" as used herein describes a composite board product formed of layers of wood, generally known as veneers, which are held together by application of an aldehyde resin adhesive system, and formed through the application of heat and pressure.

The invention particularly relates to a process of preparing board panels wherein lignocellulosic material is combined with an adhesive system, and then the lignocellulosic material and adhesive are subsequently formed into boards by the application of heat and pressure. The adhesive system of the present invention generally comprises (a) a base adhesive resin and (b) an improved extender and/or filler material.

It has now been discovered that the use of sugar beet material in the extender and/or filler material of the subject adhesive system will allow a lignocellulosic board panel manufacturer to overcome some of the undesirable effects on the chemical and/or the physical properties of the aldehyde resin adhesive systems to which they are added which are described herein. Thus the performance of the modified aldehyde resin adhesive systems during subsequent use in product manufacture will not be impeded.

Sugar beet pulp is the production residuum from the sugar beet industry. More specifically, sugar beet pulp is the residue from the sugar beet after the extraction of sucrose therefrom. Sugar beet processors usually dry the pulp. The dry sugar beet pulp can be referred to as "sugar beet shreds". Additionally, the dry sugar beet pulp or shreds can be formed and compressed to produce "sugar beet pellets". The dry sugar beet pulp comprises cellulose, hemi-cellulose, starch, pectin, lignin and protein. Conventionally, sugar beet pulp is primarily used in animal feed.

Sugar beet pulp material, preferably in finely ground, dried form, can be utilized in the adhesive system of the present invention, typically as a component of the improved extender and/or filler material. The improved filler/extender of the present invention preferably includes from about 10% to 60% by weight of sugar beet pulp material, more preferably from about 12% to 55% by weight of sugar beet pulp material, and most preferably from about 15% to 50% by weight of sugar beet pulp material.

The improved filler/extender material of this invention is typically formed under acidic conditions, preferably, for example, for hardwood lignocellulosic materials, at a pH of from about 4 to 6. In this way, the subject filler/extender material can have a similar pH level as the environment employed in consolidating the adhesive and lignocellulosic materials using pressure and heat.

The particle size of the subject sugar beet material is preferably no coarser than about 90% by weight thereof, being capable of passing through a 100 mesh screen. This is similar to the particle size of the organic flour extender/filler material.

It has now been determined that the sugar beet pulp material, when used in the subject adhesive system, facilitates various advantageous properties in the process for producing panel boards. The subject adhesive system has the ability to absorb and retain increased amounts of water. More particularly, this ability to absorb and retain increased amounts of water is significantly higher than the amount of water which can be added to a comparable extender and/or filler material including only the organic flour without the sugar beet material.

Therefore, this significant benefit can be provided by employing the sugar beet pulp material in extender and/or filler material used in the adhesive system employed in forming lignocellulosic products such as plywood.

The sugar beet material employed in this invention preferably has a moisture level of from about 4-10% by weight. Maintaining a minimum moisture level in the lignocellulosic material-adhesive system mixture is important for purposes of preventing dryout of the lignocellulosic board panel composite product and for maintaining the requisite adhesive bonding properties. Better resistance to over-penetration of the adhesive system is provided since the presence of sugar beet pulp retains moisture in lignocellulosic product.

A major advantage of having the sugar beet pulp material in the adhesive system is that it creates a relatively higher initial viscosity and, at the same time, a substantially stable viscosity. These properties both individually and in combination are not typically present in extender and/or filler materials which do not include sugar beet material, for example, extender and/or filler materials which comprise only organic flour components. The initial viscosity of the adhesive system is preferably at least about 50% higher, more preferably at least about 60% higher, and most preferably at least about 70% higher, than the initial viscosity of said adhesive system without the sugar beet material.

Furthermore, in view of this initial higher viscosity, the subject adhesive system can be combined with the lignocellulosic material in a relatively decreased amount. Thus, when sugar beet pulp material is employed, typically in place of at least a portion of an organic flour, in the extender and/or filler material of this invention, a reduction in the amount of the relative adhesive system combined with the lignocellulosic material can be provided is at least about 10% by weight, preferably at least about 12% by weight, more preferably at least about 15% by weight, and most preferably at least about 20% by weight, as compared to a comparable extender and/or filler material, typically including only the organic flour, without the sugar beet material.

The adhesive system of this invention also exhibits controlled thickening due to its more stable viscosity over time. This results in an adhesive system which can prevent substantial excess viscosity increases during the course of conducting the manufacturing process. Conversely, an adhesive system comprising a comparable extender and/or filler material without the sugar beet material, such as those including only the organic flour, can be highly unstable and typically exhibits an excess viscosity increase over time. In use, having a stable viscosity is extremely important. The adhesive material should have a minimum pot life and remain a flowable liquid. The pot life of an adhesive system is related to the ability of the adhesive system to remain flowable and to effectively function in a manufacturing process which produces a lignocellulosic board panel. Thus, when sugar beet pulp material is employed in place of at least a portion of the extender and/or filler material of this invention, typically an organic flour, a reduction can result in the relative increase in the viscosity (cps) of the adhesive system, measured at about 6 hours after formation of the adhesive system, of at least about 20%, preferably at least about 25%, more preferably at least about 30%, and most preferably at least about 40%, as compared to the viscosity (cps) of a comparable adhesive system which comprises an extender and/or filler material including only the organic flour without the sugar beet material.

The presence of a relatively lesser amount of the adhesive system permits the use of a greater amount of water in the combined lignocellulosic material-adhesive mixture. The existence of the additional water is the major reason that dryout can be prevented. Thus, when sugar beet pulp material is employed in place of at least a portion of the organic flour in the extender and/or filler material of this invention, an increase in the relative amount of the water which can be employed in the adhesive system can be provided of at least about 10% by weight, preferably at least about 12% by weight, more preferably at least about 15% by weight, and most preferably at least about 20% by weight, as compared to the amount of water which can be effectively added to a comparable adhesive system including only the organic flour but without the sugar beet material.

Despite the substantial reduction in the amount of adhesive material employed, the physical properties of the lignocellulosic products will be substantially maintained. In spite of the fact that a lesser amount of the adhesive system is being employed, excellent bonding properties, such as pre-press tack, can be maintained in the production of lignocellulosic board panels. Faster and stronger pre-press bonds are typically caused by the ability to maintain sufficient amount of the subject adhesive system at the lignocellulosic material surface to effect same. Thus, a tacky consistency is provided when the subject adhesive system is employed to coat the lignocellulosic material. When the lignocellulosic material is cold pressed at ambient temperature conditions to form a lignocellulosic product, such as plywood or the like, the layers forming same do not undergo substantial curling due to the tacky consistency of the adhesive system of this invention.

Greater assembly time tolerance permits a worker to have the flexibility to fully complete the production formation process and still have the adhesive system function in an effective manner. The adhesive system of this invention does not dry out as quickly as it's conventional counterpart and in fact maintains the requisite moisture level as described above.

The application of the sugar beet pulp material in the adhesive system as a filler is demonstrated by the presence of certain desirable properties in the adhesive system containing same. For example, filling holes & irregularities of lignocellulosic product surfaces so that a substantially smooth, uniform exterior will occur.

All of the above results in the ability to manufacture lignocellulosic products which meet the standards for uniform quality but at a significantly reduced cost.

DETAILED DESCRIPTION OF PREFERRED EMBODIMENTS

Figure 1:
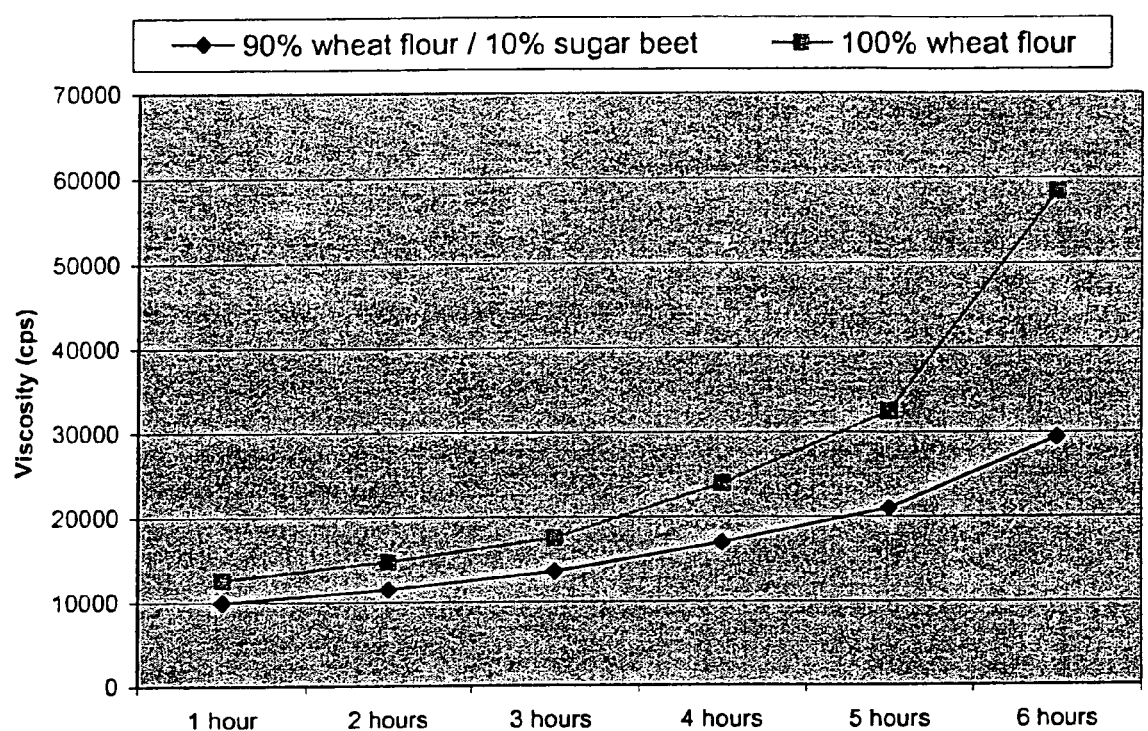
FIG. 1 is a graphical representation comparing viscosity versus time for a typical plywood adhesive system with and without 10% sugar beet as a co-extender with wheat flour.

The adhesive system of the present invention generally comprises (a) a base adhesive resin and (b) an improved extender and/or filler material. The base adhesive resin of the present invention comprises an aldehyde polymer resin which adheres together the lignocellulosic material. For example, the preferred aldehyde resins can comprise thermosetting resins such as phenol-formaldehyde, urea-formaldehyde, resorcinol-formaldehyde, and melamine-formaldehyde, the most preferred aldehydes being phenol-formaldehyde and urea-formaldehyde. The phenolic component can include any one or more of the phenols which have heretofore been employed in the formation of phenolic resins and which are not substituted at either the two ortho-positions or at one ortho- and the para-position, such unsubstituted positions being necessary for the polymerization reaction. Any one, all, or none of the remaining carbon atoms of the phenol ring can be substituted. The nature of the substituent can vary widely, and it is only necessary that the substituent not interfere in the polymerization of the aldehyde with the phenol at the ortho- and/or para-positions. Substituted phenols employed in the formation of the phenolic resins include: alkyl-substituted phenols, aryl-substituted phenols, cyclo-alkyl-substituted phenols, alkenyl-substituted phenols, alkoxy-substituted phenols, aryloxy-substituted phenols, and halogen-substituted phenols, the foregoing substituents containing from 1 to 26 and preferably from 1 to 12 carbon atoms. Specific examples of suitable phenols include: phenol, 2,6 xylenol, o-cresol, m-cresol, p-cresol, 3,5-xylenol, 3-4-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl\phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol.

The aldehydes reacted with the phenol can include any of the aldehydes heretofore employed in the formation of phenolic resins such as formaldehyde, acetaldehyde, propionaldehyde, furfuraldehyde, and benzaldehyde. In general, the aldehydes employed have the formula R'CHO wherein R' is a hydrogen or a hydrocarbon radical of 1 to 8 carbon atoms. The most preferred aldehyde is formaldehyde.

Sugar beet material as described above has been used as an additive to organic flour materials to form improved extenders/fillers employed in the formation of lignocellulosic products. Two examples of the utilization of improved extenders/fillers including sugar beet materials which are used in adhesive systems and combined with lignocellulosic materials to produce lignocellulosic board panels have been demonstrated below.

In a first example, a urea formaldehyde (UF) adhesive system is used to make hardwood plywood. In the second example, a phenol formaldehyde (PF) adhesive system is used to make softwood plywood. In each of these adhesive systems, different percentages of sugar beet were used to replace certain adhesive components.

In the UF adhesive system, sugar beet was used to replace 10% of the extender (wheat flour). Due to the high contribution to maintain the requisite initial viscosity level of the adhesive system which results from the use of sugar beet as an extender, the total amount of extender employed in the UF adhesive system was reduced by 9.3 weight %. The weight difference caused by the reduction in the amount of the extender was replaced with water. In spite of this reduction in the amount of extender, it was found that the subject adhesive system had the same viscosity as a UF adhesive made with 100% wheat flour. Subsequent tests also showed that prepress tack was not reduced with the addition of sugar beet or the reduction in the amount of the added extender.

The composition of the Urea Formaldehyde adhesive systems, with and without sugar beet extender (10% by weight), is as follows:

| Adhesive System Without Sugar Beet Pulp Added | | Adhesive System With Sugar Beet Added | |
|---|---|---|---|
| UF Resin: | 51.40% | UF Resin: | 51.40% |
| Ammonium chloride: | 0.54% | Ammonium chloride: | 0.54% |
| Water: | 21.24% | Water: | 23.74% |
| Wheat flour (extender): | 26.82% | 90% wheat flour/10% sugar beet (extender): | 24.32% |
| Viscosity: | 7190 cps | Viscosity: | 6260 cps |

By employing sugar beet in the adhesive system as a co-extender it is possible to reduce the amount of extender employed in an adhesive system, to replace it with water, while still maintaining about the same viscosity, and while sustaining good prepress tack. This results in several advantages. First, the reduction in extender provides a significant cost savings. Second, plywood mills vary their glue spread rates so as to maintain a constant amount of water on the glue line. When applying an adhesive which has a higher than average water content, it is necessary to lower the spread rate to maintain a constant amount of water. Reduced glue spread rates helps the plywood mill to lower adhesive costs. Furthermore, lower glue spread rates reduce bleed through, prevent products from blowing apart when being extricated from the forming press, improve cure speeds and facilitate the formation of flatter plywood panels.

Also, as shown in FIG. 1, it has also been determined that the addition of 10% sugar beet as a co-extender improved the stability of the adhesive system over time as compared to 100% by weight wheat flour. For example, the viscosity at about 6 hours was about 60,000 cps for a conventional adhesive system using 100% by weight wheat flour. In contradistinction, when 10% of the wheat flour was replaced with sugar beet, a 90/10 weight % wheat flour/sugar beet co-extender, the viscosity at about 6 hours was about 30,000 cps. Therefore, a reduction in the relative increase in the viscosity of the adhesive, measured at about 6 hours after adhesive formation, of about 100% was determined when the adhesive system of the present invention was employed.

In a second example, sugar beet was blended with walnut shell material to produce a superior filler product for PF adhesives. A 60% walnut shell to 40% sugar beet blend was found to be particularly useful as a filler in Canadian PF adhesive mixes. It is difficult to build viscosity in Canadian PF adhesives without adding more filler or extender due to the fact that these adhesives do not use caustic (50% NaOH). The caustic is used in American mixes to swell the wheat flour and subsequently control the viscosity of the finished adhesive.

| Adhesive System Without Sugar Beet Pulp Added | | Adhesive System With Sugar Beet Added | |
|---|---|---|---|
| Water: | 16.77% | Water: | 17.98% |
| Wheat flour: | 4.07% | Wheat flour: | 4.07% |
| FRC (filler): | 8.07% | 60% walnut shell/40% sugar beet (filler) | 6.86% |
| PF resin: | 69.35% | PF resin | 69.35% |
| Soda ash: | 1.73% | Soda ash | 1.73% |

Results:

| Filler | Viscosity | | % growth |
|---|---|---|---|
| | Initial | 24 hours | over 24 hrs |
| 60% walnut shell/40% sugar beet: (15% reduction of filler replaced with water) | 4110 cps | 4560 cps | 10.9% |
| FRC (control): | 4030 cps | 4450 cps | 9.4% |

This filler (60% walnut shell/40% sugar beet) allows the Canadian plywood plants to build greater viscosity without increasing the solids content of the adhesive. In fact, the filler content can be reduced by 15% and replaced with water to allow lower glue spread rates and increased glue cost savings while improving general glue bond properties.

The following additional examples of the adhesive systems of the present invention including (a) Urea Formaldehyde resin ("UF") and (b) Phenol Formaldehyde resin ("PF") were conducted to compare the viscosity of the subject adhesive system when sugar beet was substituted for wheat flour, as compared to the use of wheat flour per se.

UF Formulations

A conventional adhesive system for producing lignocellulosic board panels was prepared in the manner described in the first example above using a wheat flour extender and a UF Resin as follows:

| | |
|---|---|
| Water | 21.24% |
| UF Resin | 51.40% |
| Ammonium Chloride | 0.54% |
| Extender (wheat flour) | 26.82% |

The initial viscosity of this conventional adhesive system was 7190 cps.

An adhesive system of the present invention for producing lignocellulosic board panels was prepared in the manner described in the first example above using a co-extender comprising 90% wheat flour/10% sugar beet and a UF Resin as follows:

| | |
|---|---|
| Water | 21.24% |
| UF Resin | 51.40% |
| Ammonium Chloride | 0.54% |
| Co-Extender* | 26.82% |

*90% wheat flour/10% sugar beet

The initial viscosity of the adhesive system of this invention was 21,400 cps. Therefore, it was determined that replacing 10% of the wheat flour with sugar beet in the above adhesive system resulted in a 198% increase in viscosity.

PF Formulations

A conventional adhesive system for producing lignocellulosic board panels was prepared in the manner described in the first example above using a wheat flour extender and a PF Resin as follows:

| | |
|---|---|
| Water | 16.77% |
| PF Resin | 69.35% |
| Extender (wheat flour) | 4.07% |
| Filler (FRC) | 8.07% |
| Soda ash | 1.73% |

The initial viscosity of this conventional adhesive system was 4030 cps.

An adhesive system of the present invention for producing lignocellulosic board panels was prepared in the manner described in the second example above using a filler comprising 60% walnut shell/40% sugar beet and a PF Resin as follows:

| | |
|---|---|
| Water | 16.77% |
| PF Resin | 69.35% |
| Extender (wheat flour) | 4.07% |
| Filler** | 8.07% |
| Soda ash | 1.73% |

**60% walnut shell/40% sugar beet

The initial viscosity of the adhesive system of this invention was 9780 cps cps. Therefore, it was determined that replacing 100% of the FRC filler with a blend of 60% walnut shell/40% sugar beet in the above adhesive system resulted in a 143% increase in viscosity.

The invention claimed is:

1. A process for producing lignocellulosic board panels which comprises
providing lignocellulosic material;
providing an adhesive system comprising (a) a base adhesive resin and (b) an extender and/or filler material comprising sugar beet material which (i) retains substantial moisture in the lignocellulosic material, and/or (ii) creates a relatively higher initial viscosity, and/or (iii) maintains a substantially stable viscosity of said adhesive system over time;
combining said lignocellulosic material and said adhesive system; and
forming the combined lignocellulosic material and adhesive into said lignocellulosic board panels.

2. The process of claim 1, wherein said lignocellulosic board panels comprise plywood.

3. The process of claim 1, wherein said sugar beet pulp material comprises ground, dried sugar beet pulp material.

4. The process of claim 1, wherein said extender and/or filler material includes from about 10% up to about 60% by weight of said sugar beet material.

5. The process of claim 1, wherein a reduction of at least about 10% by weight in the amount of the adhesive system combined with the lignocellulosic material is provided, as compared to the amount of said adhesive system without said sugar beet material, while maintaining the moisture retainage level in the lignocellulosic material.

6. The process of claim 1, wherein the initial viscosity of said adhesive system, at a sugar beet content of from about 10 to 20 weight %, based on the total weight of said adhesive system, is at least about 50% higher than the initial viscosity of said adhesive system without said sugar beet material.

7. The process of claim 1, wherein a reduction in the relative increase in the viscosity (cps) of the adhesive system is provided, measured at about 6 hours after formation of the adhesive system, of at least about 20%.

8. The process of claim 1, wherein an increase in the amount of water which can be employed in the adhesive system can be provided of at least about 10% by weight, as compared to the amount of water which can be added to said adhesive system without sugar beet material, without substantially adversely affecting pre-press tack properties.

9. The process of claim 1, wherein said base adhesive resin comprises an aldehyde polymer resin which adheres together the lignocellulosic material.

10. The process of claim 1, wherein said extender and/or filler material comprises an organic flour.

11. A process for producing lignocellulosic board panels which comprises
providing lignocellulosic material;
providing an adhesive system comprising (a) a base adhesive resin, and (b) an extender and/or filler material comprising from about 10% up to 60% by weight of sugar beet material and from about 90% up to 40% by weight of an organic flour, which (i) retains moisture in the lignocellulosic material, and/or (ii) creates a relatively higher initial viscosity and a substantially stable viscosity over time in said adhesive system;
combining said lignocellulosic material and said adhesive system; and
forming the combined lignocellulosic material and adhesive into said lignocellulosic board panels.

12. The process of claim 11, wherein said lignocellulosic board panels comprise plywood.

13. The process of claim 11, wherein said sugar beet pulp material comprises ground, dried sugar beet pulp material.

14. The process of claim 11, wherein said extender and/or filler material includes from about 15% up to about 50% by weight of said sugar beet material.

15. The process of claim 11, wherein a reduction of at least about 10% by weight in the amount of the adhesive system combined with the lignocellulosic material is provided, as compared to the amount of said adhesive system without said sugar beet material, while maintaining the moisture retainage in the lignocellulosic material.

16. The process of claim 11, wherein the initial viscosity of said adhesive system, at a sugar beet content of from about 10 to 20 weight %, based on the total weight of said adhesive system, is at least about 50% higher than said adhesive system without said sugar beet material.

17. The process of claim 11, wherein reduction in the relative increase in the viscosity (cps) of the adhesive system is provided, measured at about 6 hours after formation of the adhesive system, of at least about %.

18. The process of claim 11, wherein an increase in the amount of water which can be employed in the adhesive system can be provided of at least about 10% by weight, as compared to the amount of water which can be added to said adhesive system without sugar beet material, without substantially adversely affecting pre-press tack properties.

19. The process of claim 11, wherein said base adhesive resin comprises an aldehyde polymer resin which adheres together the lignocellulosic material.

20. The process of claim 11, wherein said organic flour comprises ground vegetable flour or grain flour.

21. A lignocellulosic board panel which comprises
    lignocellulosic material; and
    an adhesive system comprising (a) a base adhesive resin and (b) an extender and/or filler material comprising sugar beet material.

22. A process for using sugar beat material which comprises;
    providing an adhesive system comprising (a) a base adhesive resin and (b) an extender and/or filler material comprising said sugar beet material which (i) retains substantial moisture in the lignocellulosic material, and/or (ii) creates a relatively higher initial viscosity, and/or (iii) maintains a substantially stable viscosity of said adhesive system over time;
    combining said lignocellulosic material and said adhesive system; and
    forming the combined lignocellulosic material and adhesive into lignocellulosic board panels.

23. An adhesive system for use in the formation of lignocellulosic board panels which comprises;
    a base adhesive resin; and
    an extender and/or filler material comprising sugar beet material which in the formation of lignocellulosic board panels (i) retains substantial moisture in the lignocellulosic material, and/or (ii) creates a relatively higher initial viscosity, and/or (iii) maintains a substantially stable viscosity of said adhesive system over time.

* * * * *